United States Patent [19]

Tigrett

[11] Patent Number: 5,215,280
[45] Date of Patent: Jun. 1, 1993

[54] SUPPORT CHANNEL FOR MARINE-GRADE SHORE POWER CORDS, ACCESSORY CABLES, HOSES AND SUCH

[76] Inventor: Charles R. Tigrett, 1487 Union Ave., Memphis, Tenn. 38104

[21] Appl. No.: 737,690

[22] Filed: Jul. 30, 1991

[51] Int. Cl.$^5$ .............................................. F16L 3/22
[52] U.S. Cl. ................................... 248/68.1; 174/68.3
[58] Field of Search ............... 248/49, 63, 60, 68.1, 248/48.1; 174/68.3

[56] References Cited

U.S. PATENT DOCUMENTS

| | | | |
|---|---|---|---|
| 2,847,949 | 8/1958 | Pond | 248/48.1 X |
| 3,532,312 | 10/1970 | Kopf | 248/68.1 |
| 3,941,412 | 3/1976 | Carpenter | 248/60 X |
| 4,629,826 | 12/1986 | Thomas | 174/68.3 X |
| 5,024,251 | 6/1991 | Chapman | 174/68.3 X |
| 5,067,679 | 11/1991 | Courtney | 248/49 X |

FOREIGN PATENT DOCUMENTS 3924690  4/1990  Fed. Rep. of Germany ..... 248/68.1

Primary Examiner—Ramon O. Ramirez

[57] ABSTRACT

A passive, channel-like support system routed and secured adjacent to the inside or outside upper edge of a boat slip in a marina or a boat dock to guide, retain, support and protect the marine-grade shore power cords, accessory cables, water hose and such that feed electricity and other services to a boat from receptacles or power outlets mounted on the dock. A series of standard lengths of these generally "C" shaped sections basically mounted end to end and adapted to coincide with the varying dimensions of boat slips and the different distances the cords must travel to reach from the dock-side outlets to inlets on the side of the boat. The relative uncomplicated nature of the elements, structure and precise detailing facilitate ongoing access to the cords and an easy installation process. A plurality of pairs of pre-drilled through-holes are strategically positioned along the outside edges to provide entry points for a fastening device like a screw - with a larger hole on the opposite side providing an access opening for a rotating tool such as a screw driver. Drain holes positioned along the bottom serve uncovered boat slip applications. By relocating the cords, cables and such to this support channel, adjacent dock surfaces are unencumbered while the cords and cables are retained in an accessible, attractive and safer passageway.

12 Claims, 3 Drawing Sheets

SUPPORT CHANNEL FOR MARINE-GRADE SHORE POWER CORDS, ACCESSORY CABLES, HOSES AND SUCH

BACKGROUND—FIELD OF INVENTION

This invention relates to a new retaining and support system for the marine-grade electrical power cords, accessory cables and water hoses that feed electrical power and other services to boats docked in a slip at a marina or boat dock.

BACKGROUND—CONTINUED

Over the years, as boating has grown in popularity, the size, variety and complexity of boats has grown also. Owning a larger boat gives today's boating enthusiast the advantage of more space and power and the luxury of more sophisticated electronics and accessory options. While the upside of a larger boat is added comfort, speed, etc., the downside is that boats 25 feet long and longer are no longer easily transported on a trailer behind the family car. For the larger boats, usually 30 feet long and up, 'trailering' becomes almost impossible.

The result is that most boats, 25 ft and up, are permanently moored or docked in boat slips in thousands of marinas and boat facilities all over the country and around the world. Many boats are kept in the water at a dock, year-round while others do so only during the warm months of year, depending on local climate and the preferences, assets and mobility of the boat owners.

Most larger boats also have many sophisticated electronics, accessories and options such as electric stove tops, microwave ovens, refrigerators, televisions, VCR's, telephones, sound and lighting systems, air conditioning, plus a myriad of high tech communications and navigational electronics options. Obviously, more accessories and appliances you have on-board a boat, the more complex and demanding the power requirements.

When some of the larger boats are out of the slip, out on the water, the power for these accessories is derived from either an on board generator, accessory batteries, or both.

While docked at the marina or pier, most every boat gets it's power from electrical receptacles mounted on the edge of the dock. Marine-grade power cords, or 'shore-cords' as they are called, feed the electricity into the boat from these dock-side outlets to the power inlets mounted on the side of the boat. Most boats have at least one 'shore-cord' feeding power to the boats accessories and battery chargers while many more commonly have two shore-cords. Medium size sailboats, all size yachts, houseboats and sophisticated speed boats typically all have at least one, often two or more shore cords feeding power to various options, battery chargers and the like. Accessories like a TV or phone often require a separate cable or cord and these outlets and inlets are commonly built-in adjacent to the electrical power receptacles. Water is also available in many marinas from faucets mounted on the edge of each slip or along the dock, often nearby the dock-side power boxes. A water hoses is used to bring water from the dock to the water intake on the side of the boat, sometimes in convenient proximity to the power cord and cable inlets.

The downside of ready-access to all this electrical power, cable TV and phone signals, water and such is the growing number of shore-cords, cables and hoses that clutter up the surface of the dock adjacent to the boat. In a typical situation for a 35 foot boat, the dockside power outlet box may be mounted in one corner of the back of the slip, while the boat's power inlets are located on the opposite side and up about 30 feet or so from the back of the slip. So, to 'plug-in' to the dockside power, the boat's shore cords must travel all across the back of slip and way up the side of the slip to the closest point adjacent to the boat's inlets, often 25 to 45 feet away. For large yachts, the distance is much longer. Standard practice is to simply lay the cords on top of the dock, winding indiscriminately along the path from the dock outlets to boat inlets, resulting in an unsightly, multi-coiled, snake-like mass of cords, cables and hoses that is also a potential safety hazard. Because the cords are usually just laying along the dock deck unsecured, the cords get tripped over, kicked out further into narrow dock walkways and sometimes even knocked into the water. Also, during stormy weather, heavy winds and rain can cause the cords to blow off the dock and dangle precariously in the water until retrieved.

Another common problem is as the cords 'snake' across the top of the dock, they're often forced on a path that passes right in front of the primary entrance to the boat, exactly where a boater or visitor would step to get on the boat. What usually happens is as they put their foot down at the edge of the dock, on top of the cords—and then reach over to hold on to the boat and step aboard, their weight shifts causing the cords to roll around underfoot, often causing an unfortunate and perhaps dangerous fall. I've personally witnessed boat owners, family members and visitors of all ages being caught off guard and off balance in an effort to avoid these obstacles and avert this same embarrassing and potentially serious outcome.

However, when the power source outlets on the dock happen to be in close proximity to power inlets on the boat, the cords and cables don't have to travel across that unsightly, hazardous path on the dock and this situation is avoided. That's the exception.

The problem is that the electrical outlets mounted on the dock are almost never aligned adjacent to the power inlets on the side of the boat. Reason being that with hundreds of different boat styles, independent designers, manufacturers and individual preferences, past, present and future, there's been little opportunity or incentive to attempt to standardize the location of power inlets on boats to co-incide with dock-side power boxes. As a matter of fact, new developments in the area of marine electrical systems seems to be focused on providing more, not less, complex systems, components and capabilities.

BACKGROUND—DISCUSSION OF PRESENT PRACTICES & PRIOR ART

In very few isolated situations, individual boater owners have tried solving this problem using various vinyl rope straps, ties or rake or hose clamps every so often along the dock, trying to secure the cables somehow. These crude attempts fall short because the straps and/or ties are usually not strong enough to carry the cords' weight and when one or more give way, parts of the power cords end up dangling, dangerously in the water.

The other problem with trying to strap or tie the cords and cables to the dock edge is that makes accessing or removing the cables inconvenient or very difficult. Having easy access to moving or removing the cables becomes important when the boat owner is taking a trip and must take a set of power cords along to plug into the next marina or dock destination. Also, if the boat is moved to another location for repairs, the owner usually takes the power cords along so the boat remains plugged in during repairs to prevent problems like spoiled food in a non-working refridgerator or dead batteries. In cold weather, keeping power on and bilge heaters working becomes a critical factor for a non-winterized boat.

Attempts to conceal and/or support the power cords and cables using the rake or hose clamp idea doesn't work well for many of the same reasons the straps and ties didn't work, like lack of strength, only intermittent support, etc. Plus, these open clamps are even less suited to the task because the opening of these generally "U" shaped clamps faces out-ward and perpendicular to the water making reliable support or retention of the cords, cables and hoses almost impossible.

Except for these very few isolated, make-shift, individual attempts at solving this problem, I have no knowledge of any other device, practice, relevant product or any prior art in existence within the field of my invention that has the same or even similar objectives, advantages, structure or operation.

OBJECTS AND ADVANTAGES

The objects and advantages of the present invention are:

(a) to develop an alternative route or retaining device for all the electrical cords, accessory cables and such that deliver electricity and other services to a boat when it is docked in a marina, so that the adjacent dock surfaces may be unencumbered by cords, cables and such winding their way from the power outlets on the dock to power inlets on the boat;

(b) to relocate the cords and cables to a secure channel to reclaim the dock surfaces and clear the walkways and boat entrance areas of these potentially hazardous obstacles so boat owners, family members and visitors may have clear, safe and unobstructed access to enter boats or walk along the dock;

(c) to remove the potential hazards to the cords and cables themselves to prevent them from being accidently tripped over, stepped on, caught up in boater's push carts or repair service vehicles or inadvertently knocked off into the water from their precarious positions perched at dock's edge;

(d) to provide an inconspicuous, aesthetically pleasing and reliable alternative to the mass of interwined cords, cables, and hoses that typically clutter up the dock surfaces and walkways of many otherwise very attractive facilities and settings;

(e) to provide an inconspicuous, channel to reliably retain the cords, cables and hose that also allows for easy access so the cords, etc. may be conveniently removed and replaced when necessary (such as to take along on a trip or during a repair period at another location);

(f) to provide a flexible, channel-like support system that can be readily and fairly easily adapted to the many variables in a boating or marina environment such as the non-standard, variable sizes of boat slips, the various positions of the dock-side power box outlets in relation to the inlets on the side of the boat, the variations in the structure of the dock itself from wood to metal to combinations including special marine floatation materials;

(g) to provide a product that can be easily modified and installed just below the top edge of the dock, causing little or no impairment to the aesthetic appearance or structural integrity of the dock itself so the system can be fairly easily removed and moved to another location, at a later date, if necessary;

(h) to provide a device that can be modified or varied in size or shape to adapt to special requirements or circumstances such as a channel with a larger diameter to house several of the largest power cords or a channel with a series of drain holes along the bottom for sailboat slips or any uncovered slips;

(i) to provide a device that can be installed in a series of standard length sections and then fine tuned, custom cut to fit variable length requirements or installed as one continuous piece.

Further objectives and advantages are to provide a channel for the cords, cables and hoses that can be modified to add a rubber or foam-like padding to the outer edge to provide extra cushioning to protect the cords and the hull of the boat should there be contact between the two. This invention also provides an opportunity for the development of a single molded unit of vinyl or rubber-like material that would incorporate padding for the sharp upper edge of a dock with a channel like shape built on below to serve as support and carrier for the cords, etc.

DRAWINGS: FIGS. 1-6

Note: The main drawings of the invention are numbered FIG. 1-6. Parts or other aspects of the invention are numbered 7-17. Various relevant adjacent structures or other related and pertinent components, other than the invention itself, are indicated with alphabetical symbols, A-J.

With the aforementioned objects and advantages in mind, the present invention will become more clearly understood with the following detailed drawings and description of preferred embodiment, of which;

DRAWINGS AND DESCRIPTIONS

Figure 1:
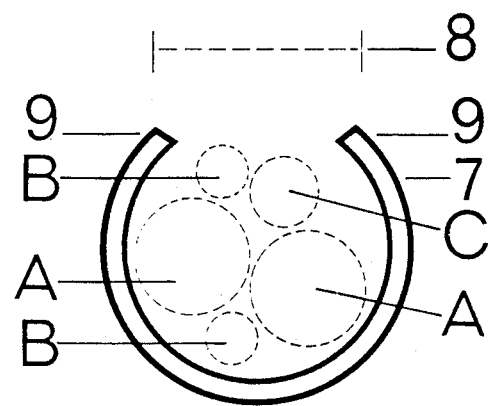
FIG. 1 is a close-up, cross-section of the generally "C" shaped supporting member, with the cords and cables supported inside this channel represented by the circles in dotted lines.
Figure 2:
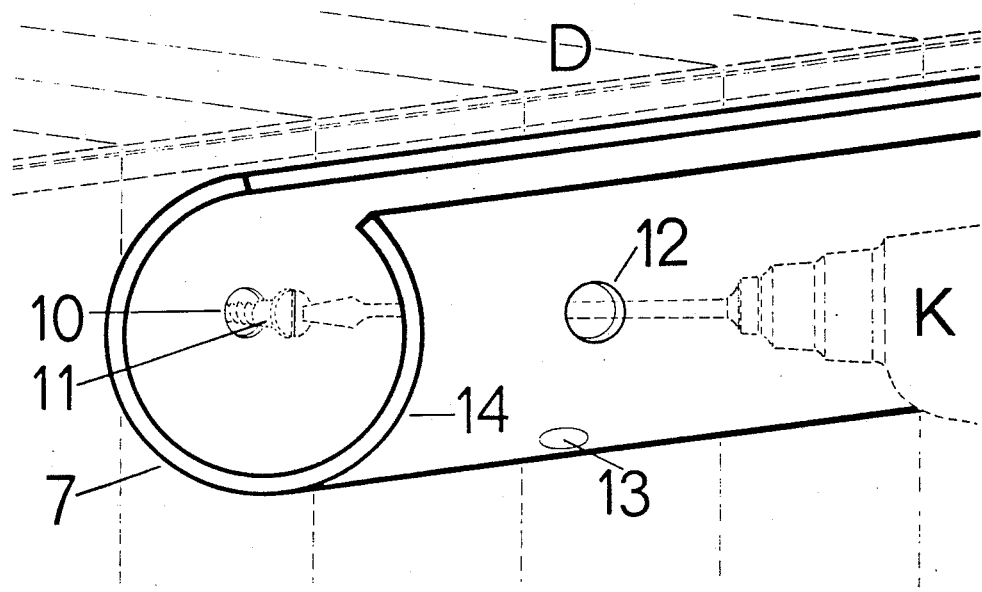
FIG. 2 is a side view of one end of channel showing the position of one pair of through holes and relevant significance of holes to a preferred method of attaching channel to dock and the position of drain holes for uncovered slip applications.
Figure 3:
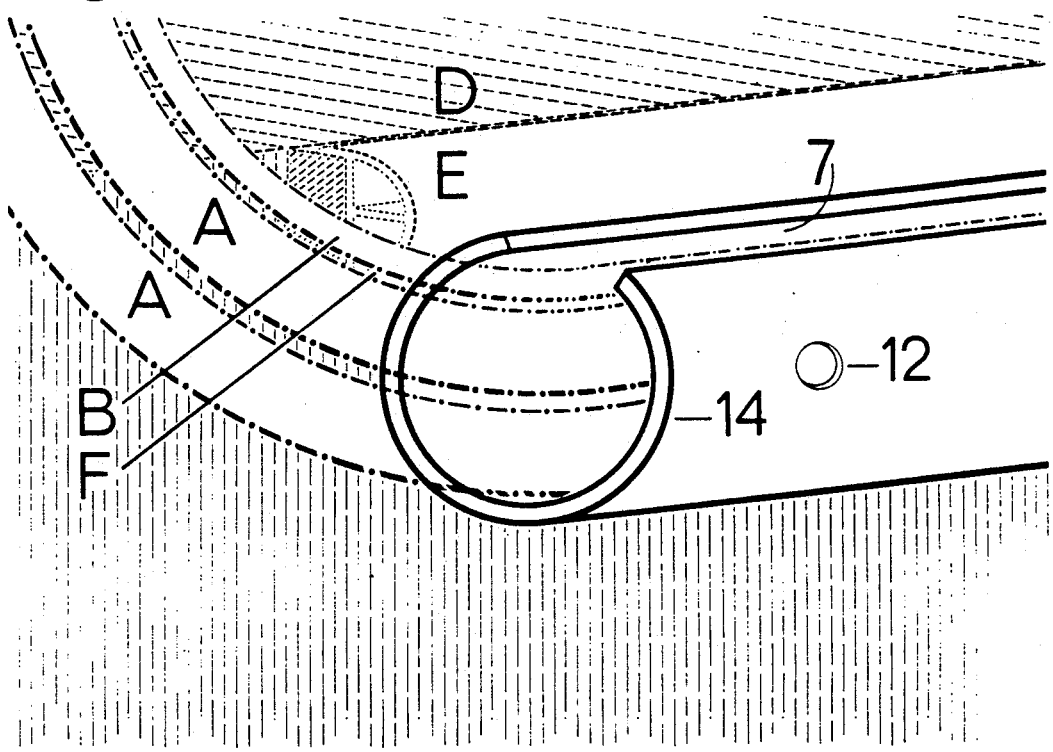
FIG. 3 is a side view of the support channel in a typical installed position close to the upper edge of a dock.

In the preferred embodiment, the cord and cable support channel is generally "C" shaped as in FIG. 1-7 cross-section of a semi-rigid, but resilient, firm rubber-like or thermoplastic composite material of sufficient size and strength to house and support several typical marine-grade shore power cords FIG. 1-A, accessory cables FIG. 1-B and/or a water hose FIG. 1-C. The initial preferred embodiment has an upward facing opening FIG. 1-8 in the support channel that is just wide enough to allow easy access for most standard marine-grade, shore power cords. This opening or slot extends evenly along the entire length of the channel so when multiple sections are installed end-to-end, the cords are supported in one continuous channel with an aligned opening so cords and such can be removed easily if necessary. The edges or lip area FIG. 1-9 of the "C" shaped channel, serve as a protective barrier to retain the cords and cable in this cradle-like channel. Other unique structural details of the support channel include a series of pairs of different size through holes, spaced evenly and intermittently along the outside edges of each channel section. The smaller holes FIG. 2-10 serve as entry points for a fastening device like a screw FIG. 2-11 while the larger hole FIG. 1-12 provides access to same for a tool such as a manual or power screw driver FIG. 2-K, facilitating the securing of the channel to adjacent dock FIG. 2-D. FIG. 2-13 are drain holes for uncovered slip applications. FIG. 3 shows preferred position of the support channel relative to top edge of dock FIG. 3-14 which is just below the strip of padded dock guard FIG. 3-E if there is one FIG. 3-E or an inch or two below the top of dock if dock surface if there is not. When there is a strip of dock guard on the dock edge, the shore cord channel installs particularly well for two reasons. First, there's usually a wood base under the padding strip which makes attaching or inserting screws relatively simple. Second, the little extra hump in the dock guard FIG. 3-E just happens to create a small recessed area FIG. 3-F below the upper edge of the dock that the shore-cord channel fits quite nicely and naturally into which incidentally enhances further the inherent aesthetic benefits benefits of this new invention while serving the more practical side-removing the hazardous clutter of cords on top of the dock.

While the first page of drawings and descriptions focused on essential structural details relating to shape, size, apertures, positioning, attaching methods, means and so forth, the second page features full views of the shore-cord channel system in place as a demonstration of how the invention would appear, install, function and operate in a typical marina, dock or boat slip environment.

Because there are obvious practical and physical limitations to producing, transporting, handling and installing this shore-cord channel system in single continuous lengths, the preferred embodiment involves a plurality of sections substantially in five foot lengths installed end-to-end to cover the bulk of the distance from the electric power supply outlets on the dock to the inlets on the side of the boat. Since this distance will vary somewhat depending on positions of both dock outlets and boat inlets, size of the boat and boat slip, etc., the remainder of the distance to be covered beyond that covered by installing multiple standard lengths, must be customized. This would simply involve cutting remaining channel pieces to match the rest of the uncovered distance. The plurality of pre-drilled through holes spaced along the sides of the channel FIG. 4-12 addresses this aspect of installation, making sure extra holes will still exist in standard length sections in the event some of it has to be cut off to adapt to variable dock lengths, optimizing custom fitting and installing in the final stages. Although there are many different vintages, makes and models of the electrical boxes mounted on dock, FIG. 4-G (2) are representations of a typical current version of the dock-side power box, where all the electricity and accessory services emanate.

Figure 4:
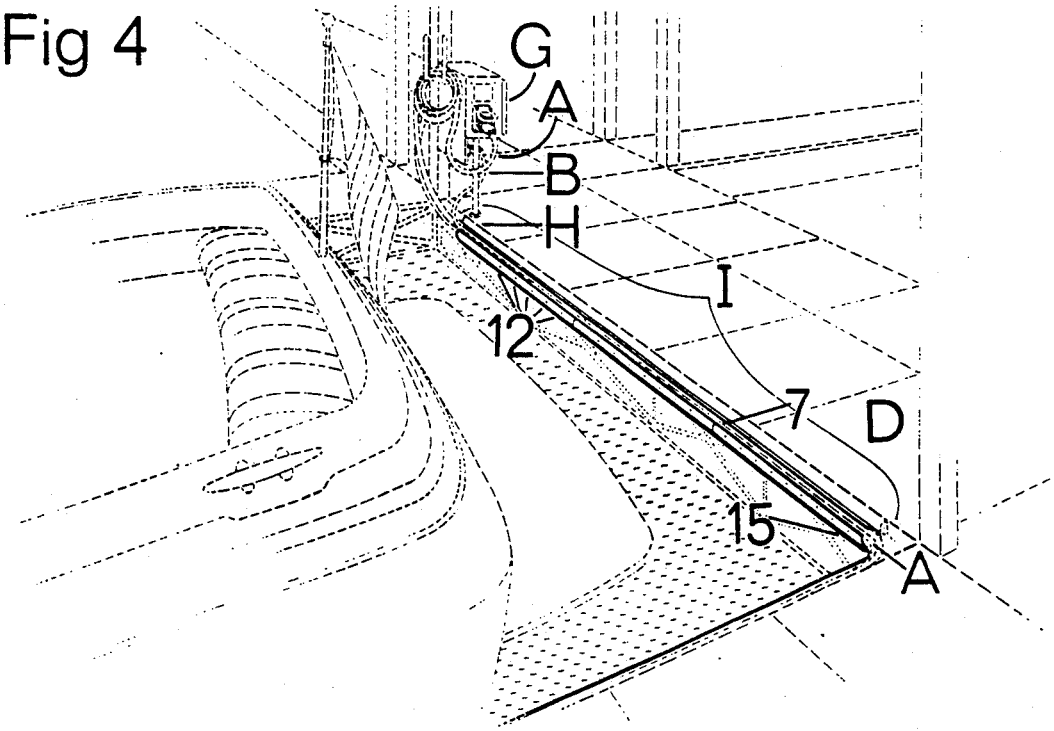
FIG. 4 is a wide view illustrating a typical first 'leg' or section of the invention installed in a typical setting.
Figure 5:
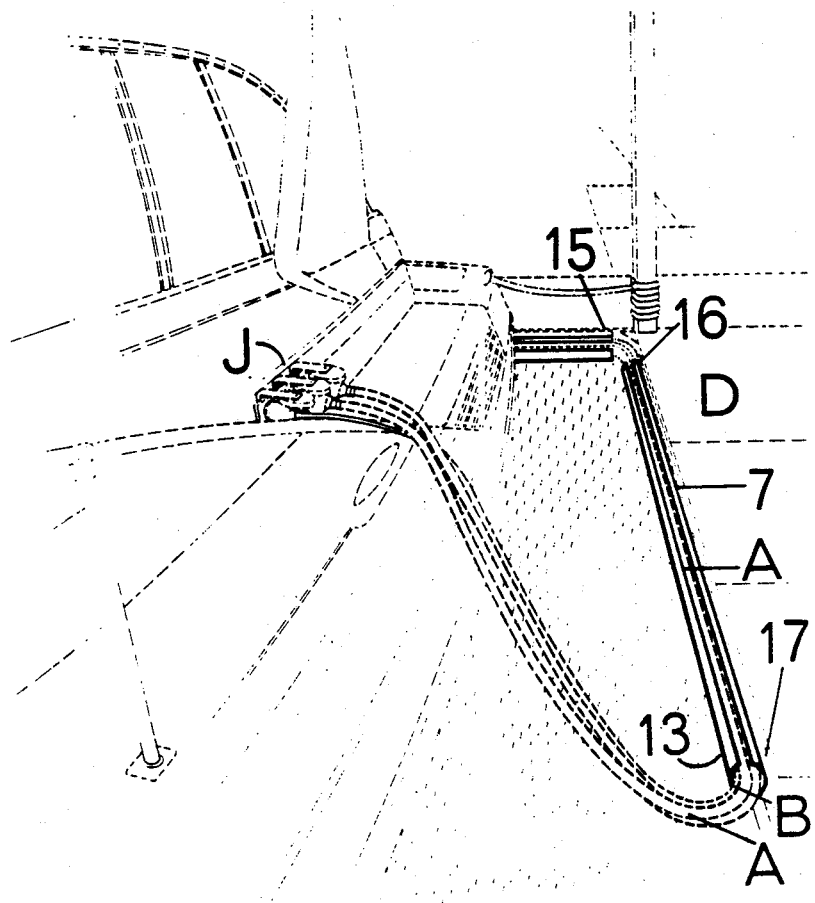
FIG. 5 is a wide view illustrating a typical second or final leg phase of the invention positioned in a typical setting.

All these special marine-grade power cords and accessory cables, such as cable TV and phone service, begin their journey from the dock-side box to the inlets on the side of the boat at this point so the first section of shore-cord channel is mounted just below the dock box at FIG. 4-H and continues along the width of the boat slip FIG. 4-I. In this example, a typical 34 ft. boat FIG. 4-K the power receptacles or inlets are located way up on the opposite side of the boat from the dock-side power box FIG. 5-J so the channel ends before the corner FIG. 4-15 and FIG. 5-15 with the cords curving on around the corner before re-entering the next section of channel at FIG. 4-16 and FIG. 5-16. The channel ends at a point on the dock FIG. 5-17 adjacent to the inlets on the side of the boat FIG. 5-J. At this point, the cords and cables just exit channel and plug in.

Figure 6:
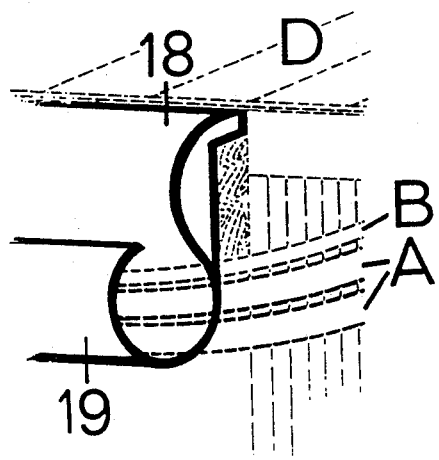
FIG. 6 is a close-up representing the general configuration and concept of an alternate embodiment of the cord channel.
Figure 7:
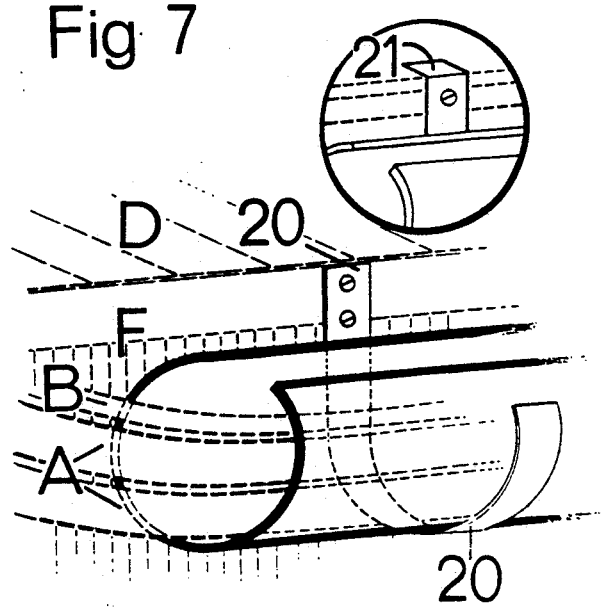

Although many variations of this invention are possible in terms of different shapes of support channels or troughs, fabrication in different materials such as wood, metal, synthetics or any combination, FIG. 6 represents an different embodiment of the cord channel in which dock edge padding FIG. 6-18 and the shore cord channel FIG. 6-19 are molded or fabricated as one unit or assembly.

SUMMARY

In view of the long-standing need for an alternative routing and retaining system for the ever growing numbers and sizes of boat electrical power cords, accessory cables, and water hoses that typically clutter up narrow dock walkways, this invention serves boat owners and marinas by solving this unsafe and unsightly problem. By creating a convenient, new, alternate route, all the marine shore power cords, accessory cables and water hoses can finally be removed from obstructing the top of the docks and relocated to an inconspicuous open channel along the inside edge of the dock. Also, because of the unique, uncomplicated design, detailing and structure, the new shore cord channel can be easily installed and adapted for use in almost any boat slip regardless of the size or dimensions of the boat slip or the length of the path from the dock-side power outlets to the boat's inlets.

Another advantage is simply the convenience of having easy access to the cords, if necessary, while having the security of knowing they're protected in this attractive, new safe passageway.

I claim:
1. A retaining device to support elongated flexible objects such as marine-grade power cords, boat accessory cables, hoses along a path from the outlets on a dock to the inlets on a boat, comprising:
   (a) a passive, channel-like member of sufficient diameter and strength to house and support said cords and cables;
   (b) with an attaching means for fixing said channel-like device to a boat dock, boat slip or pier; whereby, said cords and such are relocated to an inconspicuous, accessible, safe passageway;
   (c) wherein said supporting channel is a body of generally a plastic composite material having a C-shaped cross section with a slot or opening along the entire length of sufficient width to provide for convenient insertion and retrieval of said cords from the channel-like trough.

2. The device of claim 1 wherein the channel is fabricated substantially of a synthetic or synthetic related material.

3. The device of claim 1 wherein the channel is comprised of a plurality of open-ended sections positioned end-to-end, and attached along the edge of the dock in sufficient numbers to cover the distance from the power outlets on the dock to a position adjacent to the power inlets on the boat.

4. The device of claim 1 wherein said C-shaped channel has one series of holes spaced periodically and evenly along the dock-facing inner edge to provide an opening for a fastening device such as a screw or bolt, and a second set of holes positioned on the outer edge of the channel exactly opposite said screw holes with an opening of sufficient diameter to allow insertion and operation of a fastening tool such as a screw driver or drill, thereby, providing an access and installation means to secure the channel to the dock.

5. The device of claim 1 wherein the channel further includes a plurality of through holes positioned along the bottom side to allow for drainage in boat slips that are uncovered.

6. The device of claim 1 wherein the channel is fabricated substantially of metal or metal related material.

7. The device of claim 1 wherein the supporting channel member comprises one continuous piece.

8. The device of claim 1 wherein the supporting channel member further includes a padded area on the outer surface of the channel to provide additional protective cushioning should the boat come in contact with the channel itself.

9. The device of claim 1 wherein the cord supporting channel is molded of a firm but pliable, substantially vinyl, rubber-like material in a configuration and includes a cushioned portion that extends upward to cover the top edge of the dock.

10. The device of claim 1 wherein the cord supporting channel is built into the side of the dock structure itself.

11. The device of claim 1 wherein the channel is fabricated substantially of a wood or wood related material.

12. The device in claim 1 wherein the cord and cable channel is secured to the edge of the dock with a plurality of supporting brackets.

* * * * *